United States Patent

Katva

[15] 3,653,407
[45] Apr. 4, 1972

[54] MIXING VALVE HAVING A SWIVEL SPOUT

[72] Inventor: Ilmari Katva, Gelsted, Denmark
[73] Assignee: Broen Armatur I/S, Assens, Denmark
[22] Filed: Feb. 26, 1970
[21] Appl. No.: 14,586

[30] Foreign Application Priority Data

Feb. 27, 1969 Denmark ............................... 1101/69

[52] U.S. Cl. ........................... 137/615, 285/269, 137/625.17
[51] Int. Cl. ........................................................ F16l 27/00
[58] Field of Search ............. 137/625.17; 285/263, 264, 269, 285/273, 272

[56] References Cited

UNITED STATES PATENTS

| | | | |
|---|---|---|---|
| 3,460,571 | 8/1969 | Moen | 137/625.17 |
| 1,165,940 | 12/1915 | Busch | 137/615 X |
| 3,459,223 | 8/1969 | Katva | 137/625.17 |
| 2,175,752 | 10/1939 | Gray | 285/269 X |

*Primary Examiner*—William R. Cline
*Attorney*—Watson, Cole, Grindle & Watson

[57] ABSTRACT

A mixing valve, especially for hot and cold water and for use in connection with a kitchen sink, is constructed with a swivel spout which is articulated to permit rotation of the outer end of the spout about a horizontal axis perpendicular to the swivel axis.

1 Claims, 8 Drawing Figures

Patented April 4, 1972 3,653,407

INVENTOR
Ilmari Kalin
BY
Watson Cole, Grindle & Watson
ATTORNEY

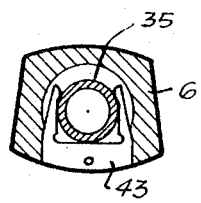 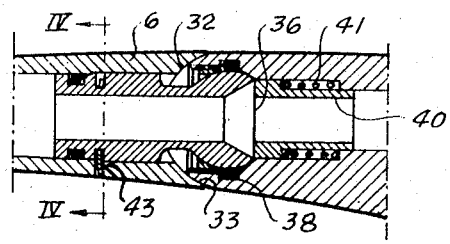
FIG. 4  FIG. 3
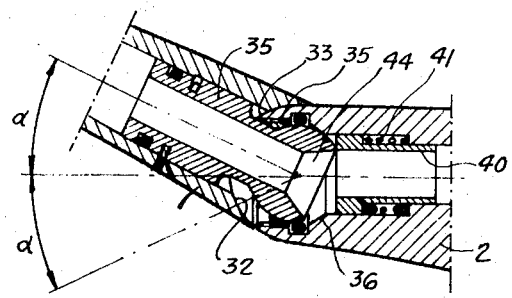
FIG. 5
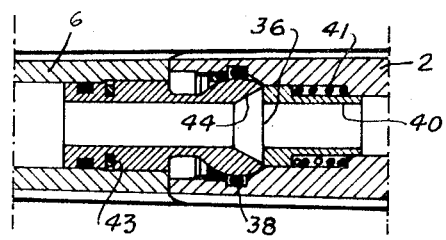
FIG. 6

MIXING VALVE HAVING A SWIVEL SPOUT

BACKGROUND OF THE INVENTION

This invention relates to a mixing valve having a swivel spout, i.e., a spout which at its inner end is rotatably connected with the housing of the valve for rotation about a vertical axis. The spout has a downwardly directed outlet end, and it is thus possible by turning the spout about its swivel axis to move the jet from the spout. However, the freedom of movement is rather restricted because it is confined to movement of the outlet end of the spout along a circular arc. It has also been proposed to provide the spout of a mixing valve with a jet nozzle which is connected with the spout by means of a ball joint. In this arrangement, too, the freedom of movement of the jet is rather limited. Besides, such jet nozzles are relatively difficult to operate and to keep clean.

SUMMARY OF THE INVENTION

It is the object of the invention to devise a mixing valve of the type considered, in which the jet from the spout can in a convenient manner be directed towards any point of a relatively large area, e.g., the bottom of a kitchen sink, with which the mixing valve is associated. According to the invention the outer part of the spout is connected with the remainder of the valve by means of an articulated joint, the articulating axis of which is substantially perpendicular to the swivel axis of the spout. Hereby the advantage is obtained that the outlet end of the spout cannot only be moved along a circular path by virtue of the swivel mounting of the spout, but can additionally be moved perpendicularly thereto by virtue of the articulated joint.

According to an embodiment of the invention, said articulated joint is formed by a concavely cylindrical end surface of one of the elements connected at the articulated joint and a convexly cylindrical end surface of the other one of said elements. Moreover, a ball joint member having a flat top may be mounted in one of the elements connected at the articulated joint, the center of said ball member being located in the common axis of said cylindrical surfaces, said ball joint member being received in a spherical recess of the other element, a sleeve being slidably mounted in said other element and being spring biased in a direction towards the flat top of said ball joint member. The ball joint member gives the joint the required freedom of movement which, however, is limited to an articulated movement by the co-operating cylindrical surfaces, and no corners are formed where dirt could be collected. Besides, the spring biased sleeve co-operating with the flat top of the ball joint member will cause the articulated joint to be returned to its neutral position.

The mixing valve may comprise a valve housing subdivided into an upper part containing control and mixing means, and a lower part for the mounting of the valve, said upper part being rotatably connected with said lower part. The advantage of this embodiment is that the mixing valve is always convenient to operate irrespective of the angular position of the spout, because the handle operating the control and mixing means of the valve takes part of the swivelling movements of the spout.

BRIEF DESCRIPTION OF THE DRAWINGS

FIG. 3 is a section along the line III—III in FIG. 2 illustrating an articulated joint, FIG. 4 a section along the line IV—IV in FIG. 3, FIG. 5 a section corresponding to FIG. 3, one part of the articulated joint being shown in a different position, FIG. 6 a section along the line VI—VI in FIG. 1, and FIG. 7A AND 7B, when put together, a vertical section through the mixing valve of FIG. 1.

DESCRIPTION OF THE PREFERRED EMBODIMENT

Figures 1, 2:
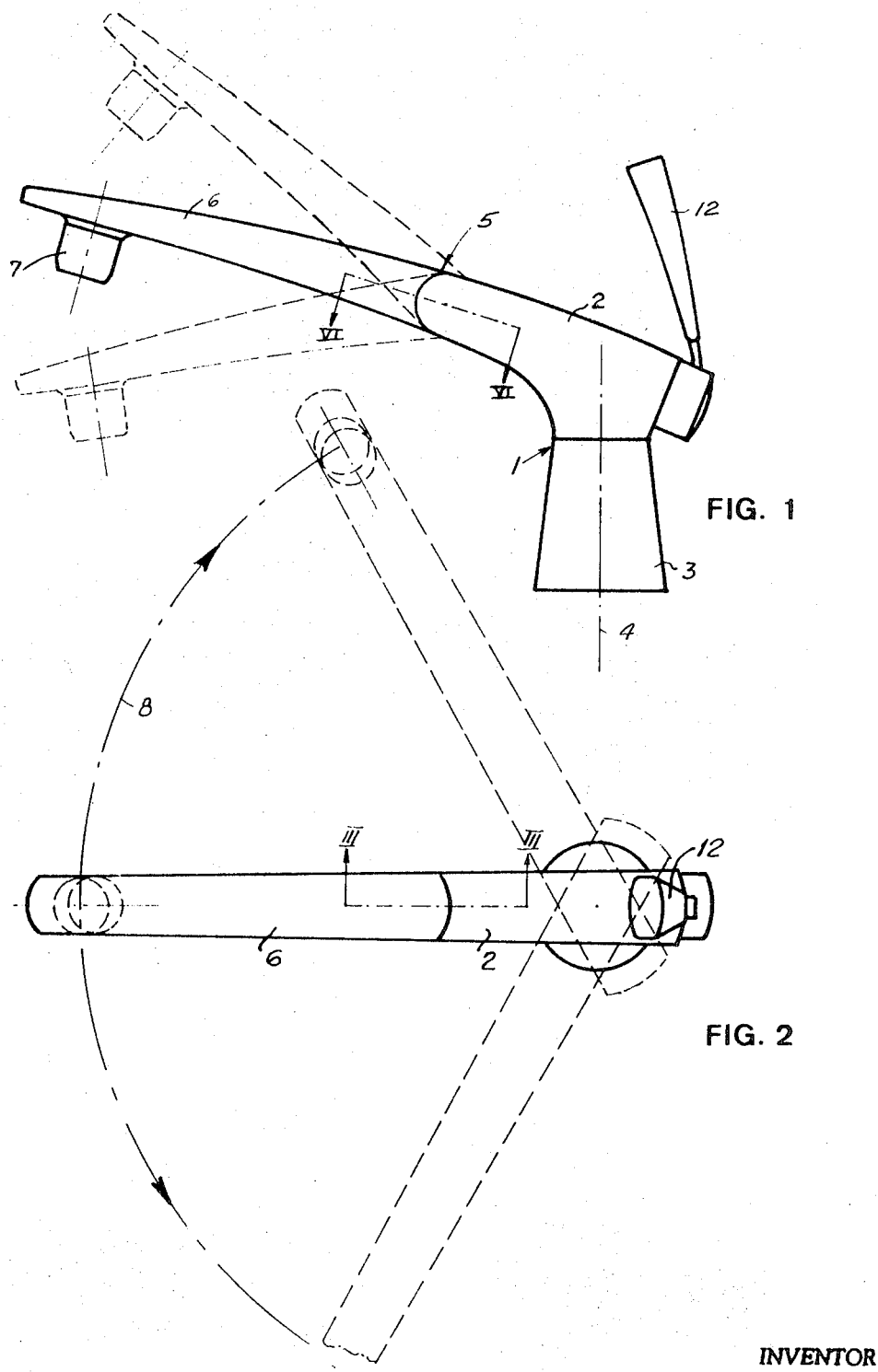
FIG. 1 shows a mixing valve according to one embodiment of the invention, in side view, two extreme positions of the spout of the valve being shown in dotted lines.
FIG. 2 shows the mixing valve of FIG. 1 in top view, top extreme positions of the spout being shown in dotted lines.

In the drawing, 1 is the housing of a mixing valve, said housing comprising two parts, viz. an upper part 2 and a lower part 3, which are connected with one another in such a manner that the upper part 2 can be rotated about a vertical axis 4. The upper part 2 contains control and mixing means, which may be constructed in any suitable manner and does not form part of the invention. A spout part 6 is connected to the upper part 2 by means of an articulated joint 5 in such a manner that it can be articulated in a vertical plane about the horizontal axis of the articulated joint 5 between the positions shown in dotted lines in FIG. 1. At the free end of the spout an outlet nozzle 7 is provided.

By virtue of the rotatable connection between the upper housing part 2 and the lower housing part 3 the spout of the mixing valve can be rotated in horizontal direction between the two positions shown in dotted lines in FIG. 2, so that the nozzle 7 will move along a circular arc 8. By virtue of the articulated joint 5 the jet from the nozzle can at the same time be rotated in the vertical plane through the spout so that the jet may be caused to strike any point of a relatively large area, e.g., the whole bottom of a kitchen sink.

Figures 7A, 7B:
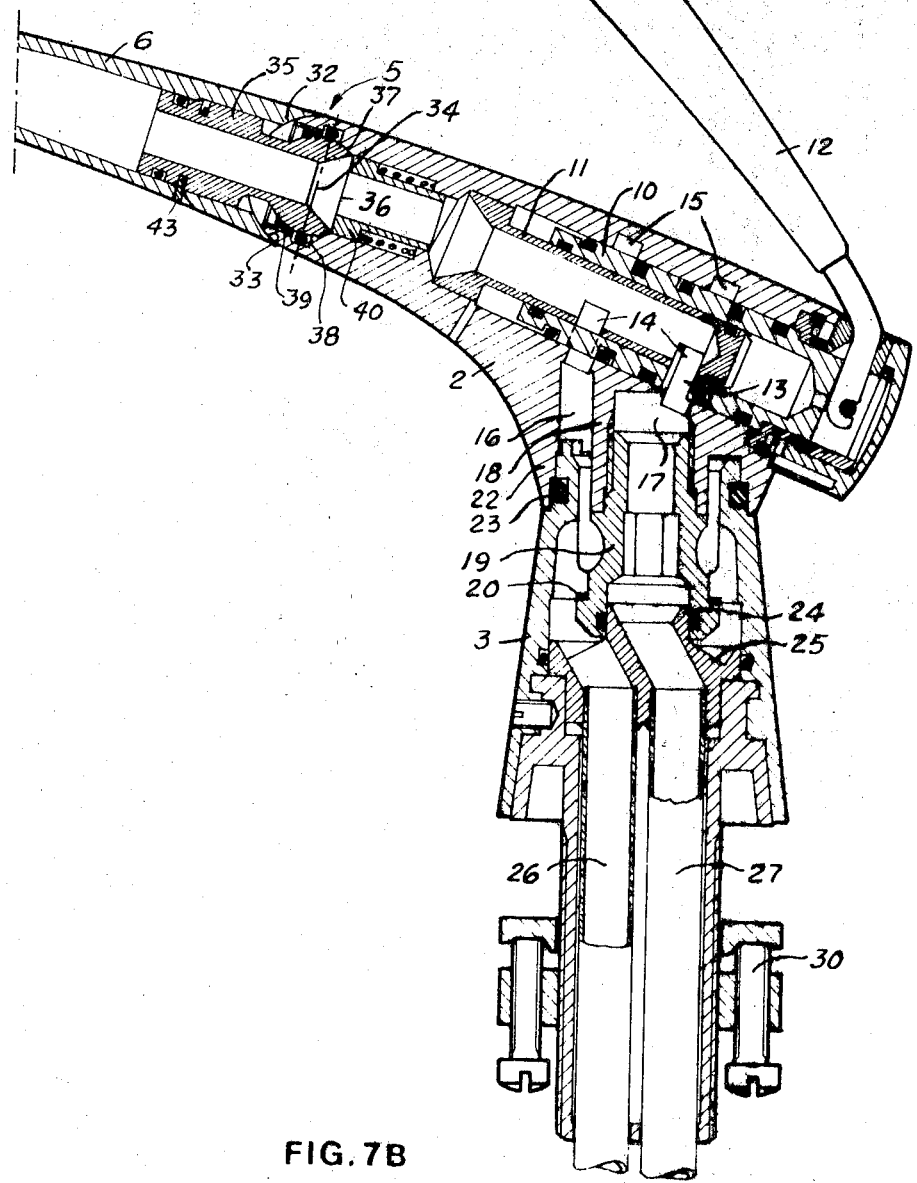

The detailed construction of the mixing valve is particularly apparent from FIGS. 7A and 7B. It will be seen that these two figures when put together show the whole of the valve, figure 7A showing the outer part of the spout and figure 7B showing the remainder of the valve.

As mentioned, the upper housing part 2 contains the control and mixing means of the mixing valve, said means consisting of a sleeve 10 and a plug 11. The sleeve 10 is connected with a handle 12 in such a manner that the sleeve may be moved axially relative to the plug 11 and may also be rotated relative thereto. By the axial movement, two ports, of which only one, 13, is shown in the sleeve 10, may be caused to overlap two ports 14 of the plug more or less, thereby to control the rate of flow. By turning the sleeve 10 about the plug 11, the overlap between one set of ports is increased, while the overlap of the other set of ports is decreased, thereby to control the mixing ratio. The supply of liquids to the control and mixing means takes place through two annular grooves 15 of the housing part 2. Each of these communicates with a supply passage 16 and 17 respectively. The housing part 2 has a hub portion 18 with an inner thread receiving a connecting member 19, which together with a journal bearing 20 keeps the upper and the lower housing parts in rotatable connection with one another. The hub portion 18 is surrounded by a shirt 22, which fits around the upper end of the lower housing part 3. Between the shirt and the housing part 3 there is provided an O-ring 23. The lower end of the connecting member 19 receives the upper end 24 of a distributing member 25 to which two supply pipes 26 and 27 for hot and cold water are connected. The distributing member has passages, by means of which the two pipes communicate with the space around the connecting piece 19 and thereby with the passage 16, and with the interior of the connecting member and thereby with the passage 17, respectively. The valve is fixed at the desired location by means of a clamping device 30 known per se.

The spout part 6 is connected through the articulated joint 5 with the upper housing part 2 substantially in line with the plug 11. The inner end of the spout is cylindrical, as shown at 32, and engages a corresponding cylindrical end surface 33 of the housing part 2. The two cylindrical surfaces have a common axis 34, and the parts are connected with each other by means of a hollow ball joint member 35, the center of which is likewise located in the axis 34 of the co-operating cylindrical surfaces. The ball joint member is truncated, as shown at 36, presenting a flattened end facing the housing part 2 and is partly received in a spherical recess 37 in the latter. An O-ring 38 is provided around the ball joint member, and the ball is prevented from being withdrawn from the spherical recess by means of a stop ring 39 having an external thread which is received in an internal thread of the end of the housing part 2.

As shown in FIG. 3, a sleeve 40 is mounted in the outer end of the housing part 2 so as to engage the flat end 36 of the ball joint member under the influence of a helical compression spring 41. It will be seen (FIG. 5) that when the spout 6 is swung upwards and downwards from its neutral position the sleeve 40 will be pressed rearwards against the force of the spring 41, which will thereby exert a restoring force on the spout 6 so that this will tend to be restored to the position shown in full lines in FIG. 1.

The ball joint member is fixed in the spout part 6 by means of a spring clip 43, FIG. 4, which is pushed through a hole on the underside of the spout and engages a groove in the shaft of the ball joint member. The bore of the ball joint member is widened such as shown at 44 in FIG. 5 so that the flow passage section through the ball joint member will not be narrowed when the spout is tilted.

I claim:

1. A mixing valve comprising a housing divided into an upper part and a lower part, said parts being mutually connected by means of a swivel joint having a vertical axis, said lower part of the housing including clamping means for mounting the valve on a pipe, said upper part of the housing including control and mixing means, there being a spout part connected to said upper part of the housing by means of an articulated joint comprising a hollow ball joint member having a flattened end and partly received in a spherical recess in said upper housing part, said joint also including a sleeve mounted in said upper part of the housing and a spring biasing the sleeve into engagement with the flattened end of said ball joint, said spout part and said upper housing part having mutually engaging cylindrical bearing surfaces, the common axis of said surfaces extending horizontally through the center of said ball joint member.

* * * * *